(12) United States Patent
Park et al.

(10) Patent No.: US 8,133,622 B2
(45) Date of Patent: Mar. 13, 2012

(54) HEATED REFORMER AND FUEL CELL SYSTEM HAVING THE SAME

(75) Inventors: Zin Park, Suwon-si (KR); Ju-Yong Kim, Suwon-si (KR); Ji-Seong Han, Suwon-si (KR); Hyun-Jeong Lim, Suwon-si (KR); Eun-Suk Cho, Suwon-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1284 days.

(21) Appl. No.: 11/218,188

(22) Filed: Aug. 31, 2005

(65) Prior Publication Data

US 2006/0051262 A1    Mar. 9, 2006

(30) Foreign Application Priority Data

Sep. 8, 2004 (KR) .................. 10-2004-0071668
Sep. 24, 2004 (KR) .................. 10-2004-0077061

(51) Int. Cl.
*H01M 8/06* (2006.01)

(52) U.S. Cl. ........ 429/408; 429/412; 429/416; 429/420; 429/433

(58) Field of Classification Search .................. None
See application file for complete search history.

(56) References Cited

U.S. PATENT DOCUMENTS

| | | | |
|---|---|---|---|
| 5,658,681 A * | 8/1997 | Sato et al. ...................... | 429/13 |
| 6,641,795 B2 * | 11/2003 | Abe ........................... | 423/648.1 |
| 2001/0029735 A1 * | 10/2001 | Miura et al. ................... | 60/512 |

FOREIGN PATENT DOCUMENTS

| | | |
|---|---|---|
| JP | 02-170367 | 7/1990 |
| JP | 07-183043 | 7/1995 |
| JP | 11-130405 | 5/1999 |
| JP | 2000-103601 | 4/2000 |
| JP | 2003-088754 | 3/2003 |
| JP | 2003-187849 | 7/2003 |
| JP | 2004-006265 | 1/2004 |
| JP | 2004-043218 | 2/2004 |
| JP | 2004-075480 | 3/2004 |
| JP | 2004-141794 | 5/2004 |

OTHER PUBLICATIONS

Machine translation of JP 2003-088754, Yamamoto, Mar. 25, 2003.*
Machine translation of JP 09-310962, Katsumi et al., Feb. 12, 1997.*

* cited by examiner

*Primary Examiner* — Barbara Gilliam
*Assistant Examiner* — Kwang Han
(74) *Attorney, Agent, or Firm* — Christie, Parker & Hale, LLP

(57) ABSTRACT

A fuel cell system is provided comprising: a reformer for generating hydrogen from hydrogen-containing fuel; and at least one electricity generator for generating electric energy through an electrochemical reaction of hydrogen and oxygen. The reformer includes a main body in which a plurality of reaction sections for generating hydrogen from hydrogen-containing fuel is integrally formed. A heating section is disposed in contact with the main body in order to supply different amounts of thermal energy to the plurality of reaction sections.

27 Claims, 14 Drawing Sheets

HEATED REFORMER AND FUEL CELL SYSTEM HAVING THE SAME

CROSS-REFERENCES TO RELATED APPLICATION

This application claims priority to and the benefit of Korean Patent Application Nos. 10-2004-0071668 filed on Sep. 8, 2004, and 10-2004-0077061 filed on Sep. 24, 2004, both applications filed in the Korean Intellectual Property Office, the entire contents of which are incorporated herein by reference.

FIELD OF THE INVENTION

The present invention relates to a fuel cell system and more particularly to a fuel cell system having an improved reformer.

BACKGROUND OF THE INVENTION

As is well known, a fuel cell is a system for generating electric energy through an electrochemical reaction between oxygen and hydrogen contained in hydrocarbon materials such as methanol, ethanol, and natural gas.

Recently developed polymer electrolyte membrane fuel cells (hereinafter, referred to as PEMFCs) exhibit excellent output characteristics, low operating temperatures, and fast starting and response characteristics. Therefore, the PEMFCs have a wide range of application including as mobile power sources for vehicles, as distributed power sources for homes or buildings, and as small-sized power sources for electronic apparatuses.

A fuel cell system employing the PEMFC scheme basically includes a stack, a reformer, a fuel tank, and a fuel pump. The fuel pump supplies fuel stored in the fuel tank to the reformer which reforms the fuel to generate hydrogen. The hydrogen and an oxygen supply such as air are fed to the stack which constitutes an electricity generator set having a plurality of unit cells.

In such a conventional fuel cell system, the reformer generates hydrogen from the hydrogen-containing fuel through a catalytic chemical reaction using thermal energy. Accordingly, the reformer generally includes a heat source for generating the thermal energy, a reforming reactor for absorbing the thermal energy and generating hydrogen gas from the fuel, and one or more carbon-monoxide reducing reactors for reducing the concentration of carbon monoxide in the hydrogen gas.

In such a conventional reformer, since the reforming reactor and the carbon-monoxide reducing reactors are separate from one another, the heat source should be separately provided to supply different ranges of thermal energy to the reforming reactor and the carbon-monoxide reducing reactor, respectively.

Therefore, since the structure of the reformer is complex, it is difficult to make the entire fuel cell system compact. In addition, since the heat exchange between the reaction parts is carried out through pipes, its heat delivery properties are inefficient.

SUMMARY OF THE INVENTION

The present invention is directed to a reformer having improved performance and a simple structure, and a fuel cell system having the reformer.

According to one embodiment of the present invention, a reformer for a fuel cell system comprises: a main body in which a plurality of reaction sections are provided in order to generate hydrogen from a hydrogen-containing fuel; and a heating section which is disposed in contact with the main body and which supplies different amounts of thermal energy to the different reaction sections.

The plurality of reaction sections may include a reforming reaction section for generating hydrogen gas from the hydrogen-containing fuel, and at least one carbon-monoxide reducing section for reducing the concentration of carbon monoxide contained in the hydrogen gas.

In one embodiment of the invention, the main body has a tubular shape of which the inner space is divided into a plurality of spaces. A reformer inlet may be formed at one end of the main body and a reformer outlet may be formed at the other end. The reaction sections are formed in the divided spaces.

In one embodiment of the invention, the heating section includes a resistance wire of a coil shape wound around the outer circumferential surface of the main body. The resistance wire may be wound around the outer circumferential surface of the main body at varying pitch to place different numbers of windings at each of the different reaction sections in order to provide a desired temperature profile to the reaction sections.

In one embodiment of the invention, the number of windings of the resistance wire in the area corresponding to the reforming reaction section is greater than that in the area corresponding to the carbon-monoxide reducing section.

The inner space of the main body may include one or more barriers for separating the different reaction sections. A suitable barrier is made of a mesh material.

The reformer may further comprise a heat insulating jacket surrounding the main body. The heat insulating jacket may include an inner wall and an outer wall surrounding the entire inner wall, the inner and outer walls being separated by a predetermined gap which in one embodiment of the invention, is maintained in a vacuum.

Suitable materials for construction of the inner wall and the outer wall include ceramics, stainless steel, and aluminum.

In another embodiment of the invention, the main body may be of a plate shape in which a channel for passing the fuel is formed. The channel generally includes a reformer inlet and a reformer outlet and may be provided as a sequence of U-bends which together form a serpentine shape.

According to this embodiment, the heating section may include a heating plate coupled to the channel-forming surface of the main body with a resistance wire pattern formed on one surface of the heating plate.

The resistance wire pattern in the area corresponding to the carbon-monoxide reducing section is configured to provide less heating than is provided to the area corresponding to the reforming reaction section in order to produce a desired temperature profile. This may be accomplished by providing different gaps, widths, or thicknesses in the resistance wire.

The gap of the resistance wire pattern in the area corresponding to the carbon-monoxide reducing section may be larger than that in the area corresponding to the reforming reaction section. Alternatively, the thickness or width of the resistance wire pattern in the area corresponding to the carbon-monoxide reducing section may be greater than that in the area corresponding to the reforming reaction section.

The plurality of reaction sections may further include a vaporization section for vaporizing the fuel before it is fed to the reformer section.

The carbon-monoxide reducing section may include a water-gas shift reaction section for reducing the concentration of carbon monoxide contained in the hydrogen gas through a catalytic water-gas shift reaction of the hydrogen gas.

The carbon-monoxide reducing section may alternatively or additionally include at least one CO oxidation section for reducing the concentration of carbon monoxide contained in the hydrogen gas through a preferential catalytic CO oxidation reaction.

The respective reaction sections may include catalyst provided in known configurations such as pellet-shaped catalyst or honeycomb-shaped catalyst.

The main body may be made of a material selected from the group consisting of stainless steel, aluminum, copper, and iron.

According to an embodiment of the present invention, a fuel cell system is provided comprising: a reformer as described above for generating hydrogen from a hydrogen-containing fuel; and at least one electricity generator for generating electric energy through an electrochemical reaction of hydrogen and oxygen.

The fuel cell system may further comprise a fuel supply unit for supplying the fuel to the reformer and an oxygen supply unit for supplying oxygen to the reformer and the electricity generator. The oxygen supply unit may include at least one air pump for supplying air to both the reformer and the electricity generator.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, exemplary embodiments of the present invention will be described in detail with reference to the attached drawings such that the present invention can be easily put into practice by those skilled in the art. However, the present invention is not limited to the exemplary embodiments, but may be embodied in various forms.

Figure 1:
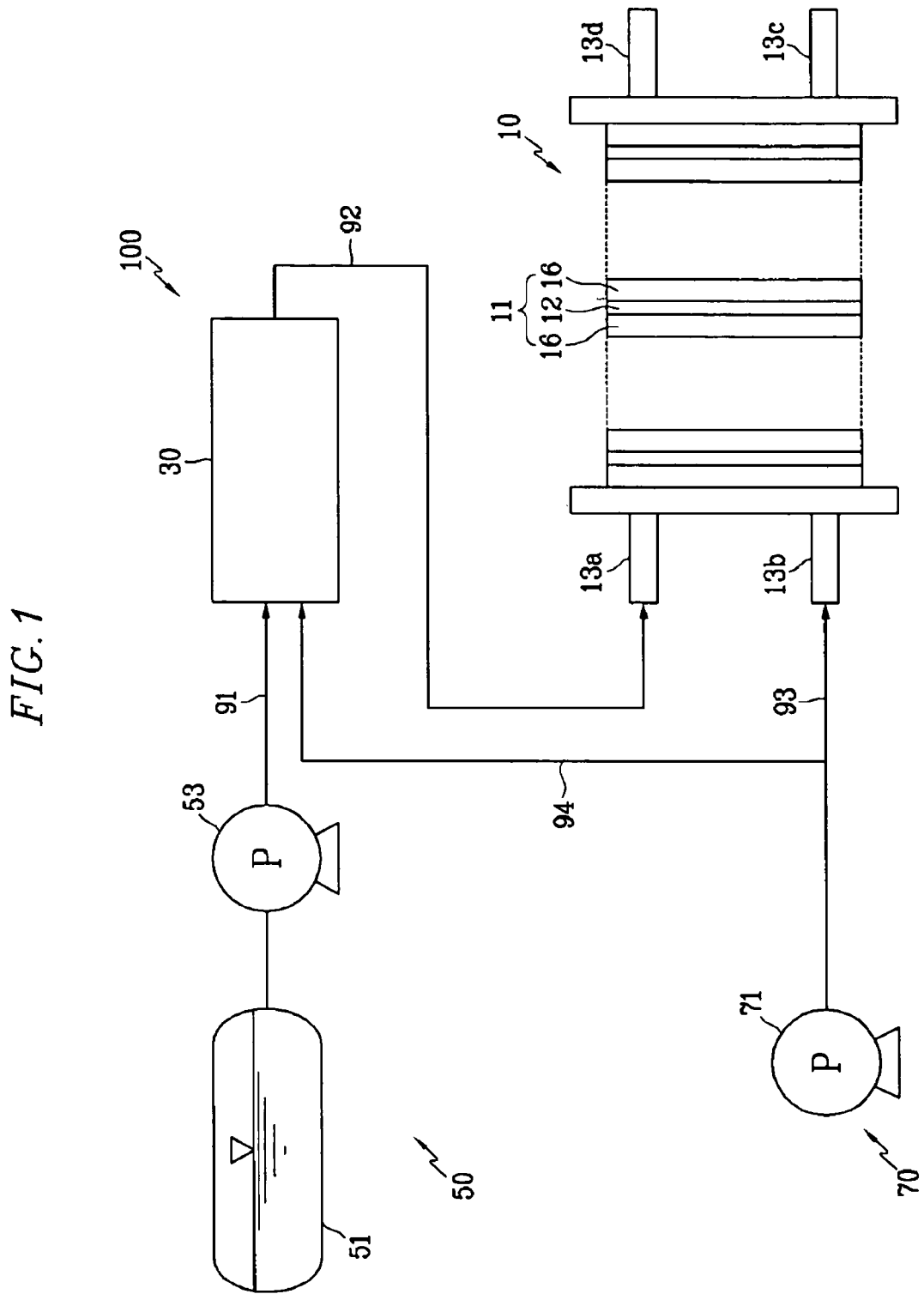
FIG. 1 is a block diagram schematically illustrating an entire construction of a fuel cell system according to an embodiment of the present invention.

FIG. 1 is a block diagram schematically illustrating an entire construction of a fuel cell system according to an embodiment of the present invention.

Referring to FIG. 1, the fuel cell system 100 according to the present invention has a polymer electrode membrane fuel cell (PEMFC) scheme, in which a hydrogen-containing fuel is reformed to generate hydrogen which is electrochemically reacted with oxygen to generate electric energy.

The fuel used for generating electricity in the fuel cell system 100 may include any liquid fuel or gas fuel containing hydrogen such as methanol, ethanol, or natural gas. However, a liquid fuel is exemplified in the following description.

The fuel cell system 100 may utilize pure oxygen stored in an additional storage device as the oxygen that is reacted with the hydrogen, or may utilize air as the oxygen source. However, the latter is exemplified in the following description.

The fuel cell system 100 basically comprises at least one stack 10 for generating electric energy through an electrochemical reaction between hydrogen and oxygen, a reformer 30 for generating the hydrogen from the fuel, a fuel supply unit 50 for supplying the fuel to the reformer 30, and an oxygen supply unit 70 for supplying oxygen to the stack 10 and the reformer 30.

Figure 2:
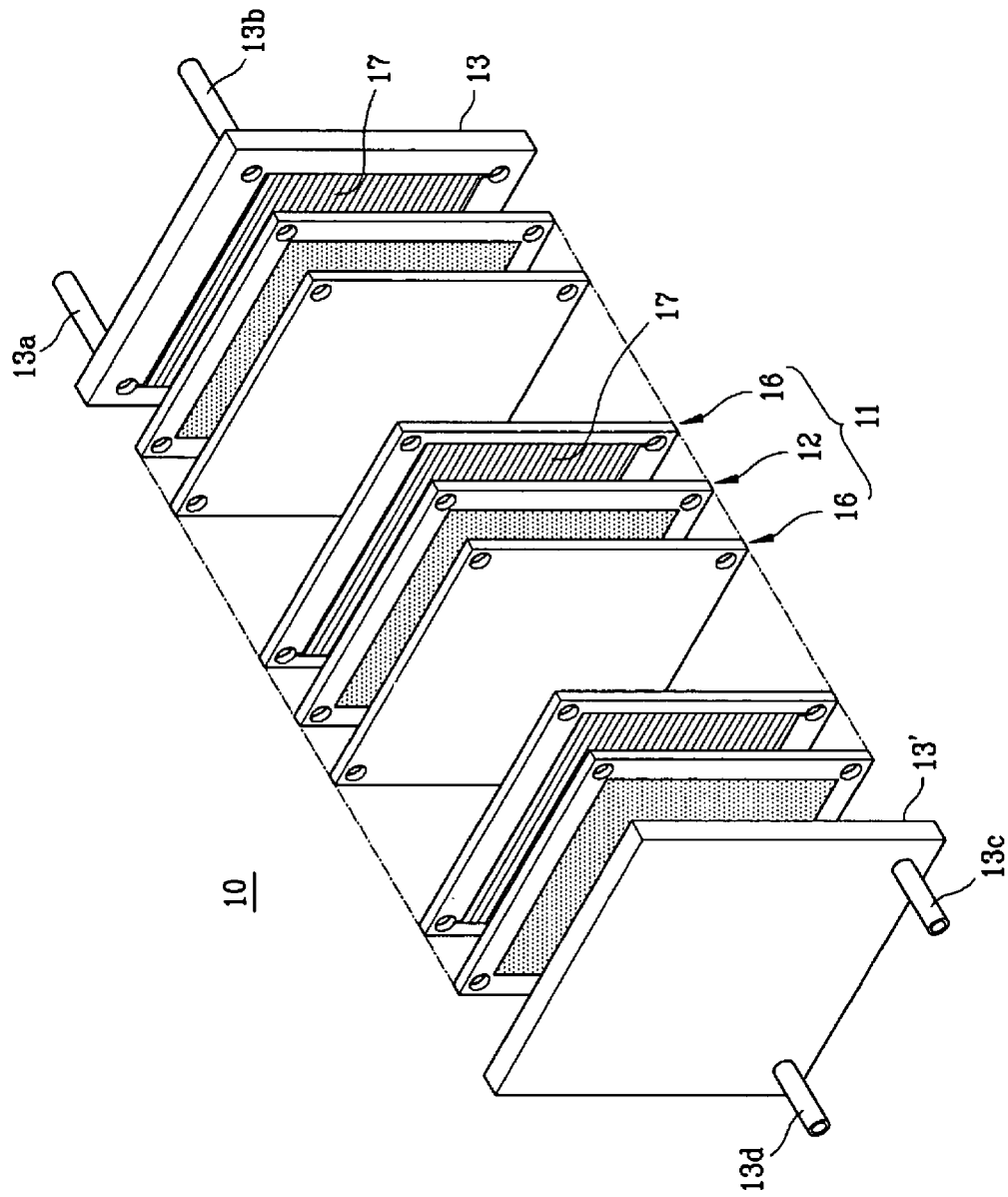
FIG. 2 is an exploded perspective view illustrating the stack shown in FIG. 1.

FIG. 2 is an exploded perspective view illustrating the stack shown in FIG. 1. The stack 10 has an electricity generator set in which a plurality of electricity generators 11 are arranged in a stacked configuration.

The electricity generator is a unit fuel cell for generating electricity in which separators (also referred to as "bipolar plates" in the art) 16 are disposed on both sides of a membrane-electrode assembly (MEA) 12.

The MEA 12 has a predetermined active area where the electrochemical reaction of hydrogen and oxygen occurs. The MEA 12 includes an anode electrode formed on one surface, a cathode electrode formed on the other surface, and an electrolyte membrane formed between both electrodes.

The anode electrode converts hydrogen into hydrogen ions (protons) and electrons through an oxidation reaction of the hydrogen. The cathode electrode generates heat and moisture of a predetermined temperature through a reduction reaction of the hydrogen ions and the oxygen. The electrolyte membrane performs an ion exchange function of moving the hydrogen ions generated from the anode electrode to the cathode electrode.

The separator 16 functions as a conductor for connecting an anode electrode with the adjacent cathode electrode in series, as well as for supplying hydrogen and oxygen to both sides of the MEA 12 throughout passages 17 formed on surfaces of the separator 16.

The outermost sides of the stack 10 may be provided with additional pressing plates 13 and 13' for bringing a plurality of electricity generators 11 into close contact with each other. Alternatively, the stack 10 according to the present invention may be constructed such that the separators 16 located at the outermost sides of the plurality of electricity generators 11 function as the pressing plates.

One pressing plate 13 is provided with a first inlet 13a for supplying the hydrogen generated from the reformer 30 to the electricity generators 11 and a second inlet 13b for supplying the air supplied from the oxygen supply unit 70 to the electricity generators 11. The other pressing plate 13' is provided with a first outlet 13c for discharging the non-reacted hydrogen gas from the electricity generators 11 and a second outlet 13d for discharging the non-reacted air containing the moisture generated through the coupling reaction between hydrogen and oxygen from the electricity generators 11.

In the present invention, the reformer 30 generates hydrogen from hydrogen-containing fuel through a catalytic chemical reaction using thermal energy. The structure of the reformer 30 will be described in detail later with reference to FIGS. 3 and 4.

The fuel supply unit 50 for supplying the fuel to the reformer 30 includes a fuel tank 51 for storing the liquid fuel, and a fuel pump 53 which is connected to the fuel tank 51 and which discharges the liquid fuel from the fuel tank 51. An additional tank (not shown) supplying water to the reformer 30 may be further provided, and is within the scope of the present invention. Here, the reformer 30 and the fuel tank 51 are connected to each other through a first supply line 91. The reformer 30 and the first inlet 13a of the electricity generators 11 are connected to each other through a second supply line 92.

The oxygen supply unit 70 includes at least one air pump 71 for supplying air with a predetermined pumping power to the reformer 30 and the electricity generators. The air pump 71 and the second inlet 13b of the stack 10 are connected to each other through a third supply line 93. The air pump 71 and the reformer 30 are connected to each other through a fourth supply line 94.

A first embodiment of the reformer 30 according to the present invention will be described in detail with reference to the attached drawings.

Figure 3:
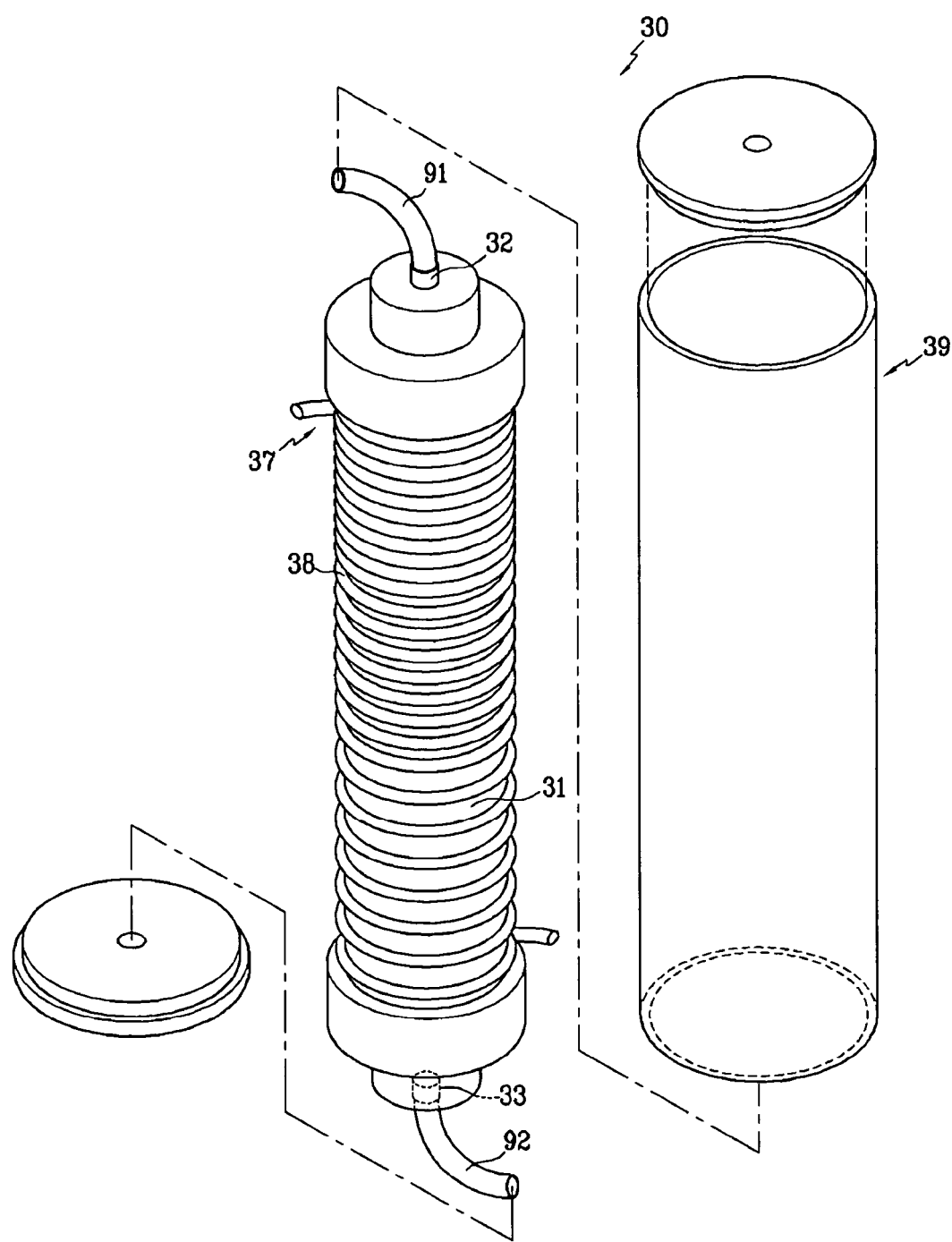
FIG. 3 is an exploded perspective view illustrating a reformer according to a first embodiment of the present invention.
Figure 4:
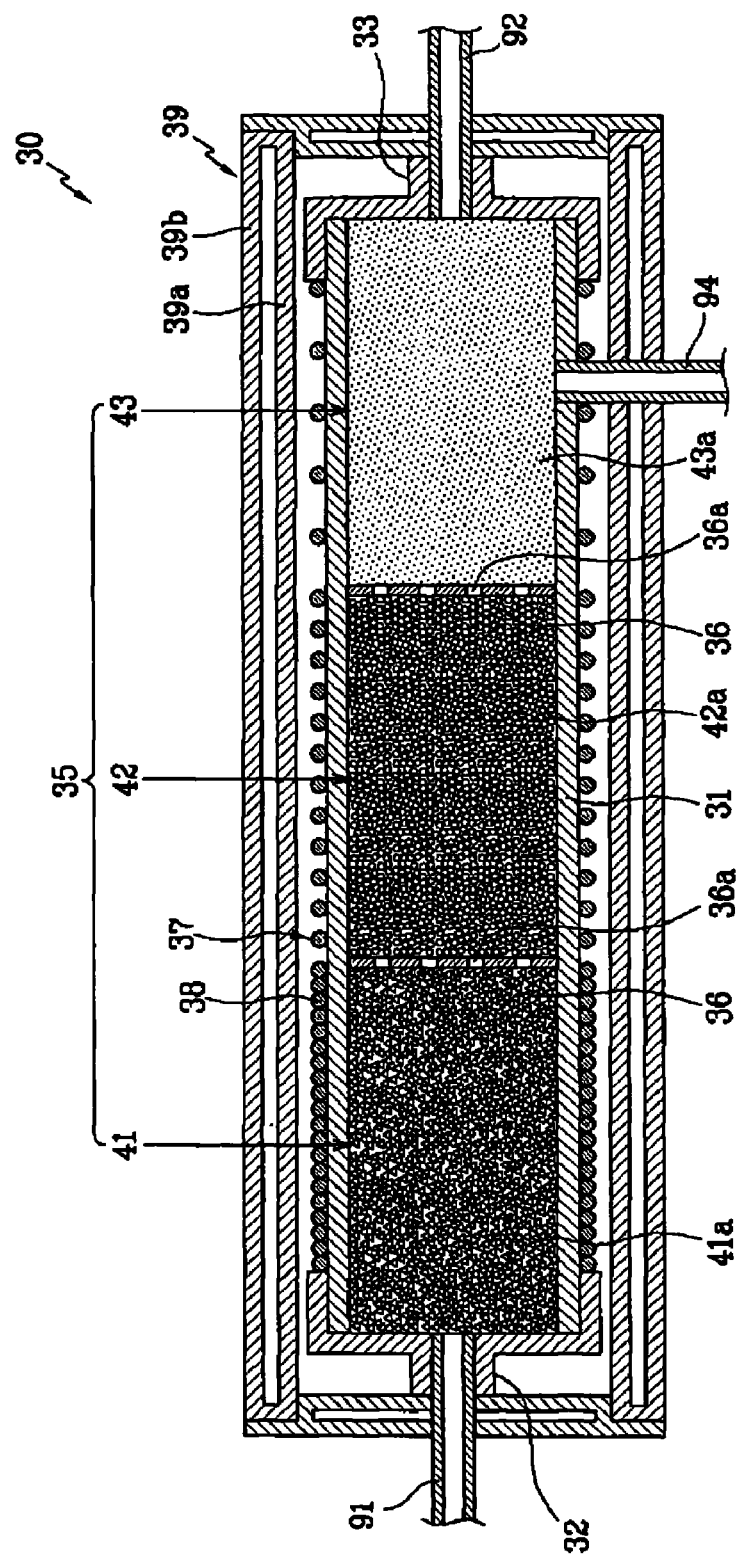
FIG. 4 is a coupled cross-sectional view illustrating the reformer of FIG. 3.

FIG. 3 is an exploded perspective view illustrating a reformer according to the first embodiment of the present invention and FIG. 4 is a cross-sectional view of the reformer shown in FIG. 3.

Referring to the figures, the reformer 30 according to the present embodiment comprises a tubular main body 31 having an inner space, a plurality of reaction sections 35 formed in partitioned spaces of the inner space of the main body 31 and which generate hydrogen from fuel, and a heating section 37 which comes in contact with the outer circumferential surface of the main body 31 and which supplies the thermal energy necessary for reactions to occur in the respective reaction sections 35. That is, a plurality of reaction sections 35 is integrally formed with the main body 31.

In the present embodiment, the main body 31 has a reformer inlet 32 formed at one end and a reformer outlet 33 formed at the other end. The reformer inlet 32 and the fuel tank 51 of the fuel supply unit 50 are connected through the first supply line 91. The reformer outlet 33 and the first inlet 13a are connected through the second supply line 92.

The main body 31 may be made of a material such as stainless steel, aluminum, copper, iron, or the like.

The inner space of the main body 31 is partitioned with barriers 36 and the reaction sections 35 are disposed in the partitioned spaces, respectively. The barriers 36 are formed as perforated disks with a plurality of bores 36a which allow the reaction gas to pass successively through the respective reaction sections 35 to the reformer outlet 33 while substantially partitioning the inner space of the main body 31. It should be noted that while the barriers 36 are described as perforated disks, other arrangements such as a mesh configuration may also be used.

In this particular embodiment of the invention, the inner space of the main body 31 is partitioned into three spaces by the barriers 36. A first reaction section 41, a second reaction section 42, and a third reaction section 43 are sequentially formed from the reformer inlet 32 to the reformer outlet 33. However, this embodiment is not intended to limit the present invention. Accordingly, the inner space of the main body 31 may be partitioned into more or fewer spaces.

For this embodiment, the first reaction section 41 is a reforming reaction section for generating hydrogen gas from fuel through a catalytic steam reforming (SR) reaction of the fuel. The second reaction section 42 and the third reaction section 43 are carbon-monoxide reducing sections which substantially reduce the concentration of the carbon monoxide contained in the hydrogen gas.

The first reaction section 41 disposed in the vicinity of the reformer inlet 32 is supplied with the fuel from the fuel tank 51 through the first supply line 91. The first reaction section 41 vaporizes the fuel and causes the steam reforming catalytic reaction to generate hydrogen from the vaporized fuel. The first reaction section 41 includes a reforming catalyst 41a for promoting the steam reforming reaction of the fuel. The catalyst 41a has a pellet shape and is filled in the inner space of the main body 31 corresponding to the first reaction section 41. The catalytic steam reforming reaction that takes place in the first reaction section 41 is an endothermic reaction and the reaction temperature ranges from about 300° C. to 600° C.

The second reaction section 42 is disposed successive to the first reaction section 41 and serves to primarily reduce the concentration of carbon monoxide contained in the hydrogen gas generated from the first reaction section 41 through a catalytic water-gas shift (WGS) reaction. The second reaction section 42 includes a second catalyst 42a promoting the water-gas shift reaction of the hydrogen gas. The second catalyst 42a has a pellet shape and is filled in the inner space of the main body 31 corresponding to the second reaction section 42. The water-gas shift reaction with the catalyst 42a in the second reaction section 42 is an exothermic reaction and the reaction temperature ranges from about 200° C. to 300° C.

The third reaction section 43 is disposed successive to the second reaction section 42 in the vicinity of the reformer outlet 33 and serves to secondarily reduce the concentration of carbon monoxide contained in the hydrogen gas through a preferential catalytic CO oxidation (PROX) reaction. The third reaction section 43 includes a third catalyst 43a for promoting the preferential CO oxidation reaction of the hydrogen gas and the air. The third catalyst 43a has a pellet shape and is filled in the inner space of the main body 31 corresponding to the third reaction section 43. The preferential CO oxidation reaction that occurs in the third reaction section 43 is an exothermic reaction and the reaction temperature ranges from about 150° C. to 200° C.

The third reaction section 43 is connected to the air pump 71 of the oxygen supply unit 70 through a fourth supply line 94.

The heating section 37 supplies thermal energy to the reaction section 35, and is disposed to come in contact with the outer circumferential surface of the main body 31 and includes a resistance wire 38 for generating the thermal energy with a predetermined power.

In the present embodiment, the resistance wire 38 is wound around the outer circumferential surface of the main body 31 and is provided on the outer circumferential surface of the main body with different numbers of winding such that the plurality of reaction section 35, can be maintained at the proper reaction temperatures necessary for the corresponding reactions of the respective reaction sections 35. Various methods can be used to achieve this such as by adjusting the winding pitch.

In the present embodiment, the number of windings of the resistance wire 38 wound around the outer circumferential surface corresponding to the first reaction section 41 is greater than the number of windings of the resistance wire 38 wound around the outer circumferential surface corresponding to the second reaction section 42. The number of windings of the resistance wire 38 around the outer circumferential surface corresponding to the second reaction section 42 is greater than the number of winding of the resistance wire 38 around the outer circumferential surface corresponding to the third reaction section 43.

That is, since the first reaction section 41 should be kept at the highest temperature, the resistance wire 38 wound around the outer circumferential surface corresponding to the first reaction section 41 is disposed denser, thereby enhancing the heat delivery rate with the resistance wire 38. Since the second reaction section 42 has a reaction temperature lower than that of the first reaction section 41, the resistance wire 38 wound around the outer circumferential surface corresponding to the second reaction section 42 is looser than the resistance wire 38 wound around the outer circumferential surface corresponding to the first reaction section 41. Since the third reaction 43 has a reaction temperature lower than that of the second reaction section 42, the resistance wire 38 wound around the outer circumferential surface corresponding to the third reaction section 43 is looser than the resistance wire 38 wound around the outer circumferential surface corresponding to the second reaction section 42.

According to the present embodiment, since the resistance wire 38 is wound around the outer circumferential surface of the main body 31 to have different numbers of windings corresponding to the different reaction sections 35, it is possible to supply thermal energy of different temperature ranges to the respective reaction sections 35.

In order to more efficiently deliver the thermal energy generated from the resistance wire 38 to the inside of the main body 31, the reformer 30 may further include a heat insulating jacket 39 to reduce the leakage of the thermal energy generated from the resistance wire 38. By forming the heat insulating jacket 39, it is possible to further enhance the reaction efficiency and the thermal efficiency of the reformer 30.

The heat insulating jacket 39 according to the present embodiment is formed in a cylindrical shape surrounding the entire main body 31 including the resistance wire 38. The heat insulating jacket 39 includes an inner wall 39a surrounding the main body 31 and an outer wall 39b surrounding the entire inner wall 39a while supporting the inner wall 39a at a space apart from the inner wall 39a by a predetermined gap. It is preferable that the space between the inner wall 39a and the outer wall 39b is kept under a vacuum.

The inner wall 39a and the outer wall 39b are made of a heat insulating material having a relatively small thermal conductivity, for example, a heat insulating metal material such as stainless steel, zirconium, or aluminum or a heat insulating non-metal material such as a ceramic material.

In the process, the thermal energy generated from the resistance wire 38 is blocked from leaking externally by the heat insulating jacket 39. That is, the thermal energy generated from the resistance wire 38 is primarily blocked by the inner wall 39a of the heat insulating jacket 39 and then is secondarily blocked by the outer wall 39b. This helps to allow the heat insulating jacket 39 to minimize the loss of energy, thereby enhancing the reaction efficiency and the thermal efficiency of the whole reformer 30.

Operations of the fuel cell system according to the first embodiment of the present invention will be now described in detail.

First, the resistance wire 38 that is wound around the outer circumferential surface of the main body 31 supplies the respective reaction sections 35 with the thermal energy for keeping the respective reaction sections 35 at the desired temperature ranges. Since the resistance wire 38 is wound in different numbers of windings around the respective reaction sections 35, the first reaction section 41 can be kept at its reaction temperature of 300° C. to 600° C., the second reaction section 42 can be kept at its reaction temperature of 200° C. to 300° C., and the third reaction section 43 can be kept at its reaction temperature of 150° C. to 200° C.

In this state, the fuel pump 53 supplies the fuel stored in the fuel tank 51 to the inner space of the main body 31 through the first supply line 91. Then, the first reaction section 41 absorbs the thermal energy from the resistance wire 38 and generates hydrogen gas containing carbon dioxide from the fuel through a steam reforming reaction using the thermal energy. At this time, it is difficult for the first reaction section 41 to completely carry out the steam reforming reaction and thus an amount of hydrogen gas containing carbon monoxide as a byproduct is generated.

Subsequently, the hydrogen gas is supplied to the second reaction section 42 through the bores 36a of the barrier 36. Then, the second reaction section 42 generates additional hydrogen through a water-gas shift reaction, thereby primarily reducing the concentration of carbon monoxide contained in the hydrogen gas.

Next, the hydrogen gas is supplied to the third reaction section 43 through the bores 36a of the barrier 36. The air pump 71 supplies air to the third reaction section 43 through the fourth supply line 94. Then, the third reaction section 43 secondarily reduces the concentration of carbon monoxide contained in the hydrogen gas through the oxidation reaction of the hydrogen gas and the air.

The hydrogen generated from the fuel is discharged through the reformer outlet 33 of the main body 31 from the third reaction section 43 and is supplied to the electricity generators 11 of the stack 10 through the second supply line 92. At this time, the air pump 71 supplies the air to the electricity generators 11 through the third supply line 93.

Then, the hydrogen is supplied to the anode electrode of the membrane-electrode assembly 12 through the separators 16 of the electricity generators 11. The air is supplied to the cathode electrode of the membrane-electrode assembly 12 through the separators 16.

The anode electrode decomposes the hydrogen gas into electrons and protons (hydrogen ions) through an oxidation reaction. The protons are moved to the cathode electrode through the electrolyte membrane and the electrons are moved to the cathode electrode of the neighboring membrane-electrode assembly 12 through the separator 16, but not through the electrolyte membrane. At this time, the flow of electrons causes a current to flow, and heat and water are also generated as byproducts.

That is, in the reformer 30 described above, a plurality of reaction sections 35 are formed on a main body 31, the resistance wire 38 provides different amounts of thermal energy to each of the reaction sections 35 according to the numbers of windings at the reaction sections. Using this structure, it is possible to simplify the structure of the reformer and to make the entire fuel cell system compact. It is also possible to enhance the efficiency of the entire fuel cell system.

Modified examples of the first embodiment are described now. Elements of the modified examples substantially equal to those of the first embodiment are not described and shown in detail, but only elements of the modifies examples different from those of the first embodiment are described and shown in detail.

Figure 5:
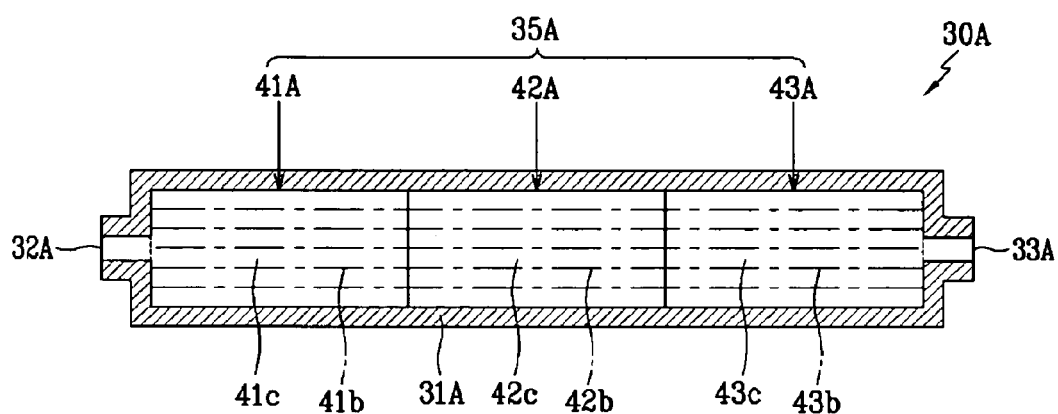
FIG. 5 is a cross-sectional view illustrating a reformer according to a first modified example according to the first embodiment of the present invention.

FIG. 5 is a cross-sectional view illustrating a reformer according to a first modified example of the first embodiment of the present invention.

Referring to FIG. 5, the reformer 30A according to the present modified example, includes main body 31A which defines a reformer inlet 32A and a reformer outlet 33A, and the reaction sections 35A are composed of a first reaction section 41A for promoting the reforming reaction, a second reaction section 42A for reducing the CO by the WGS reaction, and a third reaction section 43A for reducing the CO by the PROX reaction, each having a honeycomb-shaped catalyst. Accordingly, the respective reaction sections 35A have a structure that catalyst materials 41$b$, 42$b$, and 43$b$ are carried in a plurality of parallel penetrating holes 41$c$, 42$c$, and 43$c$, that is, on the inner surfaces of ceramic or metal carrier cells. The penetrating holes 41$c$, 42$c$, and 43$c$ constitute passages for passing the fuel and the catalyst materials 41$b$, 42$b$, and 43$b$ necessary for the reaction specific to the respective reaction sections 35A are formed on the inner surfaces of the passages.

Figure 6:
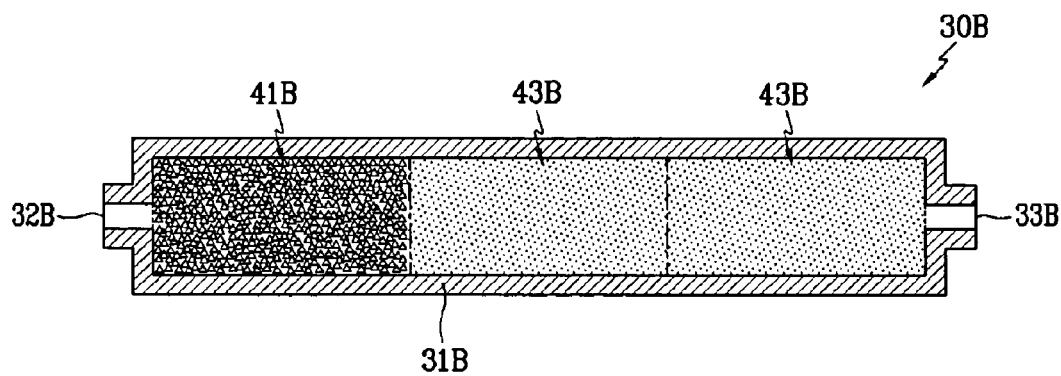
FIG. 6 is a cross-sectional view illustrating a reformer according to a second modified example of the first embodiment of the present invention.

FIG. 6 is a cross-sectional view schematically illustrating a reformer of a second modified example of the first embodiment of the present invention.

Referring to FIG. 6, reformer 30B includes a main body 31B that includes a reformer inlet 32B, and a reformer outlet 33B. A first reaction section 41B for promoting the reforming reaction, and at least two third reaction sections 43B are also provided. The first reaction section 41B and at least two third reaction sections 43 are sequentially disposed from the reformer inlet 32B to the reformer outlet 33B of the main body 31B. The third reaction sections 43B serve to reduce the concentration of carbon monoxide contained in the hydrogen gas generated from the first reaction section 41B through the preferential CO oxidation catalytic reaction.

Although two third reaction sections 43B are shown in FIG. 6, the present invention is not limited to this and more number of third reaction sections may be provided.

Figure 7:
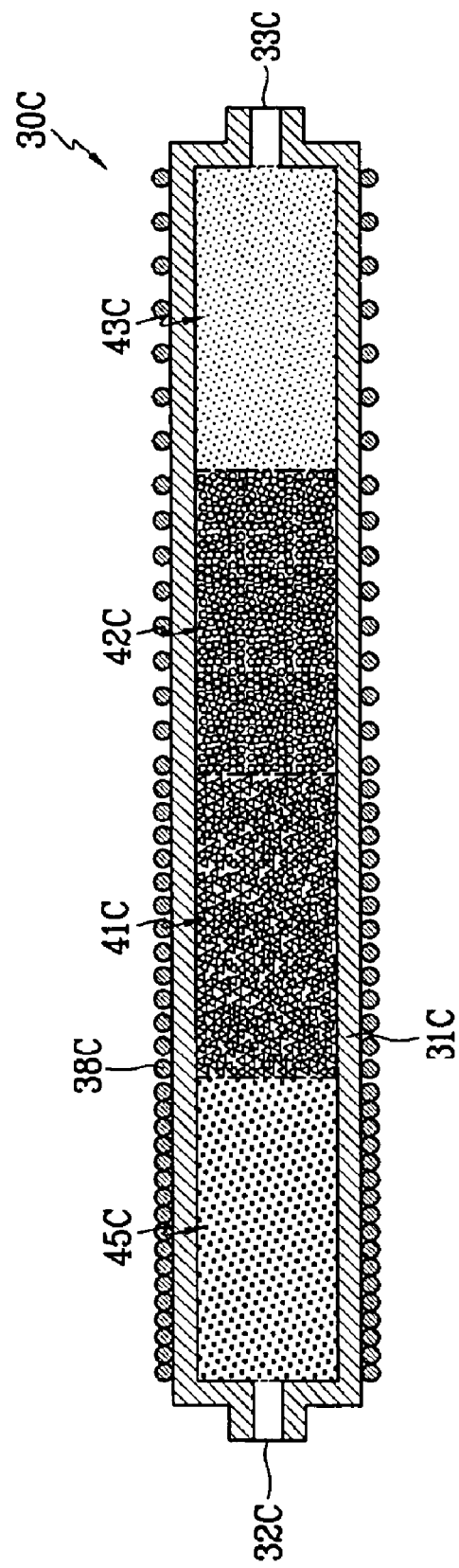
FIG. 7 is a cross-sectional view illustrating a reformer according to a third modified example of the first embodiment of the present invention.

FIG. 7 is a cross-sectional view schematically illustrating a reformer according to a third modified example in the first embodiment of the present invention.

Referring to FIG. 7, the reaction sections of the reformer 30C according to the present modified example include a vaporization section 45C, a first reaction section 41C for promoting the reforming reaction, a second reaction section 42C for reducing the CO content by the WGS reaction, and a third reaction section 43C for reducing the CO content by the PROX reaction. The vaporization section 45C, the first reaction section 41C, the second reaction section 42C, and the third reaction section 43C are sequentially disposed from the reformer inlet 32C to the reformer outlet 33C of the main body 31C.

The vaporization section 45C vaporizes the fuel supplied through the reformer inlet 32C and supplies the vaporized fuel to the first reaction section 41C. The vaporization of fuel occurs at a temperature of about 700° C. The vaporization section 45C is supplied with the thermal energy for keeping the temperature at about 700° C. using the resistance wire 38C.

The resistance wire 38C is wound in the most number of windings around the outer circumferential surface of the main body 31C corresponding to the vaporization section 45C. Here, the number of windings becomes smaller in the order of the first reaction section 41C, the second reaction section 42C, and the third reaction section 43C.

Figure 8:
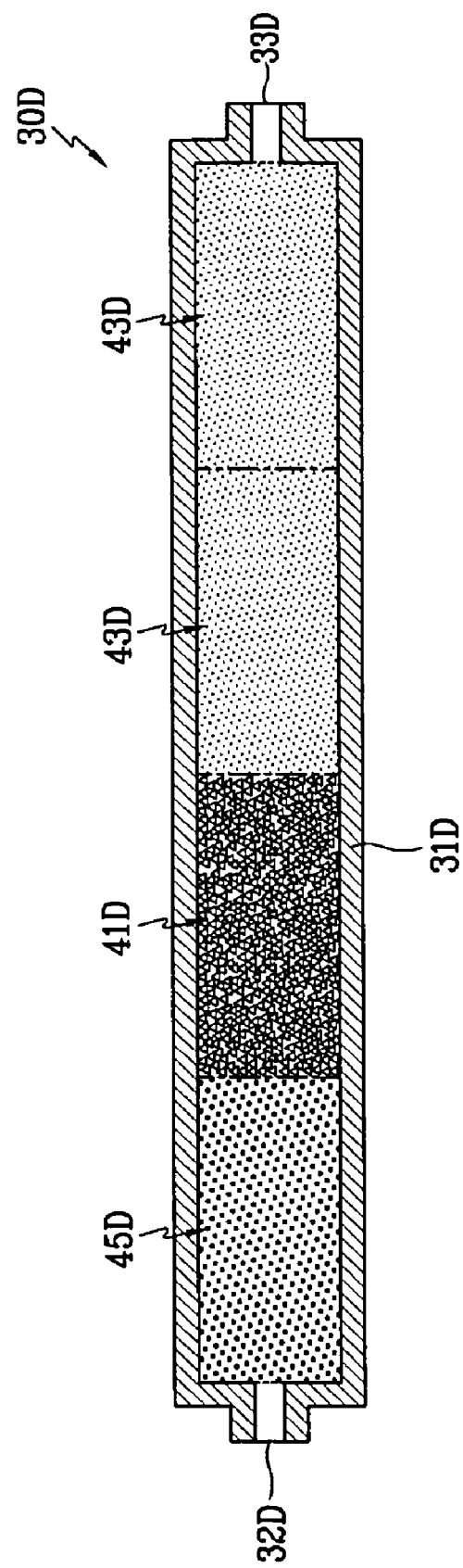
FIG. 8 is a cross-sectional view illustrating a reformer according to a fourth modified example of the first embodiment of the present invention.

FIG. 8 is a cross-sectional view schematically illustrating a reformer according to a fourth modified example in the first embodiment of the present invention.

Referring to FIG. 8, the reaction sections of the reformer 30D according to the present modified example include a vaporization section 45D, a first reaction section 41D for promoting the reforming reaction, and at least two third reaction sections 43D for reducing the CO content by the PROX reaction. The vaporization section 45D, the first reaction section 41D, and the at least two third reaction sections 43D are sequentially disposed from the reformer inlet 32D to the reformer outlet 33D of the main body 31D.

Hereinafter, a reformer according to a second embodiment of the present invention and a reformer according to modified examples thereof will be described in detail. Elements substantially equal to those of the first embodiment are not described and shown and only elements different from those of the first embodiment are described and shown in detail.

Figure 9:
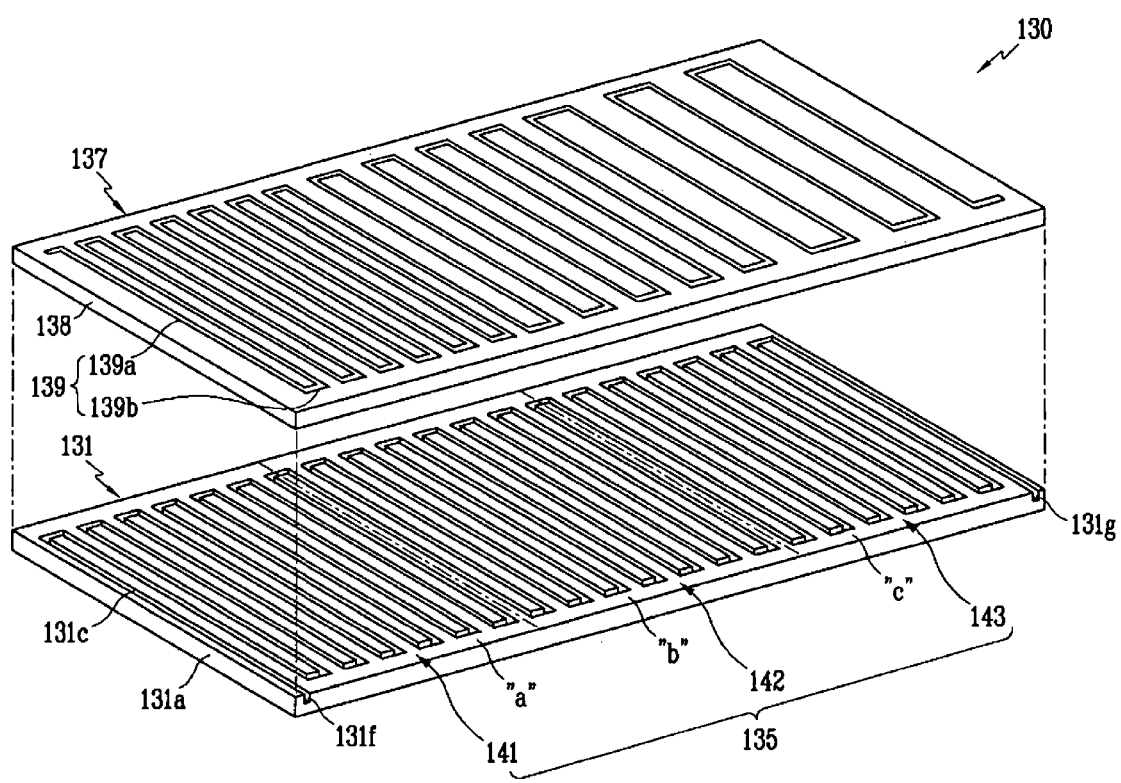
FIG. 9 is an exploded perspective view illustrating a reformer according to a second embodiment of the present invention.
Figure 10:
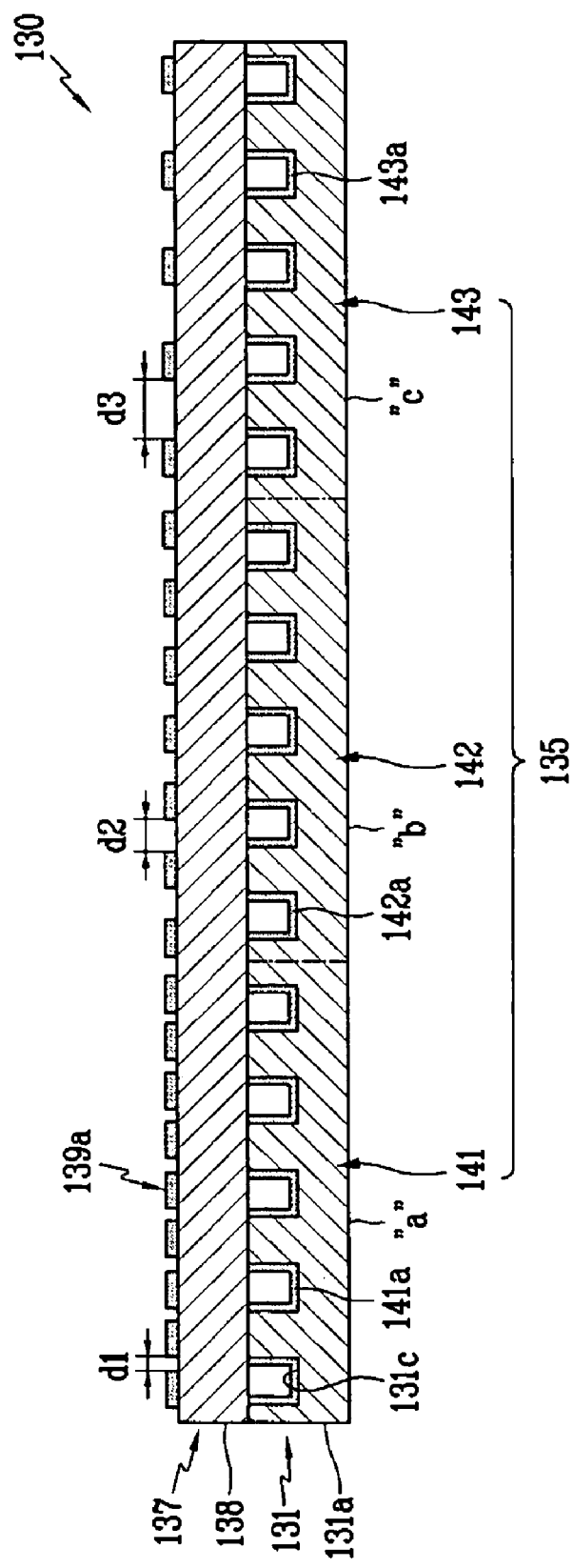
FIG. 10 is a coupled cross-sectional view of the reformer of FIG. 9.

FIG. 9 is an exploded perspective view illustrating a reformer according to the second embodiment of the present invention and FIG. 10 is a coupled cross-sectional view of the reformer shown in FIG. 9.

Referring to the figures, the reformer 130 according to this embodiment of the invention includes a reaction plate 131 which defines a channel 131$c$ for enabling the flow of fuel and in which the catalytic reactions take place. A heating section 137 is provided that is closely coupled to the reaction plate 131. The heating section 137 generates thermal energy to supply the thermal energy to the reaction plate 131.

In the reaction plate 131, the channel 131$c$ for enabling the flow of fuel and air is formed on one surface of the main body 131$a$. The channel 131$c$ has a structure that channels are disposed in a series of U-bends in a serpentine arrangement. The channel 131$c$ further defines a reformer inlet 131$f$ where the fuel enters the channel 131$c$, and a reformer outlet 131$g$ where the hydrogen that is generated from the fuel is discharged.

The reaction plate 131 may be made of a material with good thermal conductivity such as metal. Exemplary metals include aluminum, copper, nickel, and iron.

In this embodiment of the invention, a plurality of reaction sections 135 is integrally formed on the reaction plate 131 which serves as a main body.

The heating section 137 supplies the thermal energy necessary for the reaction sections 135 formed on the reaction plate 131. The heating section 137 may include a heating plate 138 closely disposed on one surface of the main body 131$a$ of the reaction plate 131 upon which a resistance wire pattern 139 is disposed on one surface. The resistance wire pattern 139 is supplied with predetermined power to supply the thermal energy to the respective reaction sections 135.

The heating plate 138 is disposed in close contact with the surface of the reaction plate 131 on which the channel 131c is formed, thereby forming a passage for passing the fuel. The heating plate 138, like the reaction plate 131, may be made of a material with good thermal conductivity. Examples include metals such as aluminum, copper, nickel, and iron.

The heating plate 138 can be coupled to the main body 131a of the reaction plate 131 with conventional coupling means (not shown). The two may be fused to one another such as welding or frit, or may be fastened such as with nuts and bolts. However, the coupling means is not limited to such methods and the two may be coupled in various ways.

The resistance wire pattern 139 may be made of a material with good conductivity and which can generate heat of a predetermined temperature upon application of power. Exemplary materials include copper and nickel. The resistance wire pattern 139 may be formed on one surface of the heating plate 138, for example, by using a conventional deposition method or a conventional etching method with a mask.

The resistance wire pattern 139 of this embodiment includes sequential U-bends that together form a serpentine arrangement similar to the flow channel 131c of the reaction plate 131. First portions 139a are arranged parallel to one another and extend on one surface of the heating plate 138. Second portions 139b alternately connect ends of the first portions 139a, thereby forming the serpentine shape. However, the resistance wire pattern 139 is not limited to such a serpentine shape, and may include various other shapes.

In addition, since the heating plate 138 and the resistance wire pattern 139 are made of conductive materials, an insulating film (not shown) may be formed between the resistance wire pattern 139 and the heating plate 138.

In the present embodiment, a plurality of reaction sections 135 is integrally formed on the reaction plate 131. Accordingly, a plurality of reaction areas a, b, and c corresponding to the plurality of reaction sections 135 are formed on the reaction plate 131.

The plurality of reaction areas a, b, and c can be divided into a first area a disposed on the surface of the reaction plate 131 close to the reformer inlet 131f of the channel 131c, a second area b disposed successive to the first area a, and a third area c disposed close to the reformer outlet 131g and successive to the second area b.

Similarly to the first embodiment, the first reaction section 141, the second reaction section 142, and the third reaction section 143 of the reaction sections 135 are disposed in the first area a, the second area b, and the third area c, respectively.

The catalysts promoting the reactions of the reaction sections 141, 142, and 143 are formed in the form of catalyst layers 141a, 142a, and 143a, respectively on the inner surface of the channel 131c.

A reforming catalyst layer 141a is provided on the inner surface of the channel 131c corresponding to the first area a in which the first reaction section 141 is formed. A water-gas shift catalyst layer 142a promoting the water-gas shift reaction is formed on the inner surface of the channel 131c corresponding to the second area b in which the second reaction section 142 is formed. A preferential CO oxidation catalyst layer 143a promoting the preferential CO oxidation reaction is formed on the inner surface of the channel 131c corresponding to the third area c in which the third reaction section 143 is formed.

Similar to the first embodiment, the reaction temperature of the first reaction section 141 ranges from 300° C. to 600° C., the reaction temperature of the second reaction section 142 ranges from 200° C. to 300° C., and the reaction temperature of the third reaction section 143 ranges from 150° C. to 200° C.

In the present embodiment, the first portions 139a of the resistance wire pattern 139 are disposed with different gaps so as to supply different amounts of thermal energy to the reaction sections 141, 142, and 143. A decrease in gap between the first portions 139a of the resistance wire pattern 139 increases the number of passes of the resistance wire pattern 139, thereby generating more thermal energy.

In the present embodiment, the first portions 139a of the resistance wire pattern 139 are formed with a gap d1 in the area corresponding to the first reaction section 141 which is smaller than the gap d2 in the area corresponding to the second reaction section 142. The gap d2 in the area corresponding to the second reaction section 142 is smaller than the gap d3 in the area corresponding to the third reaction section 143.

That is, the heating section 137 supplies the first reaction section 141 with the most amount of thermal energy, supplies the second reaction section 142 with a less amount of thermal energy than the first reaction section 141, and supplies the third reaction section 143 with a less amount of thermal energy than the second reaction section 142.

Accordingly, the first reaction section 141 can be kept at a reaction temperature ranging from 300° C. to 600° C., the second reaction section 142 can be kept at a reaction temperature ranging from 200° C. to 300° C., and the third reaction section 143 can be kept at a reaction temperature ranging from 150° C. to 200° C.

For the reformer 130 described above, a plurality of reaction sections 135 are formed on the reaction plate 131 as a main body, the heating section 137 is integrally formed with the reaction plate 131, and the resistance wire pattern 139 is disposed with different gaps, thereby generating different amounts of thermal energy. Accordingly, the respective reaction sections 135 can be kept at the desired reaction temperatures for the respective reactions.

According to such an embodiment, it is possible to simplify the structure of the reformer and to make the entire fuel cell system compact. It is also possible to enhance the efficiency of the entire fuel cell system.

Figure 11:
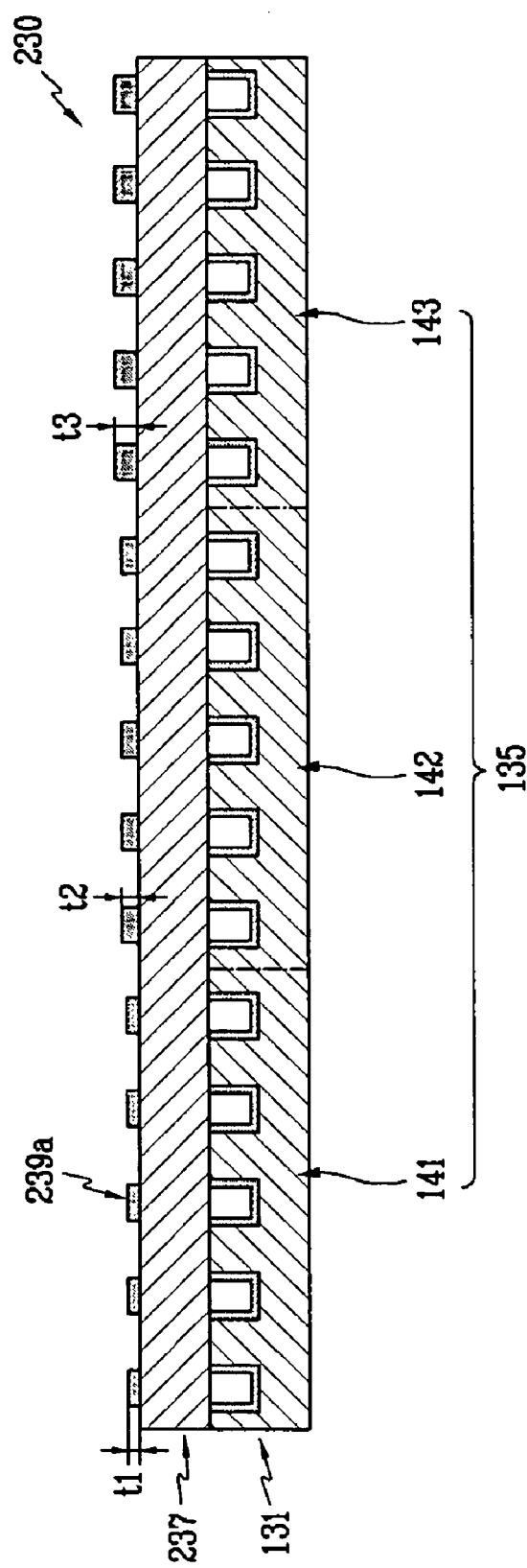
FIG. 11 is a cross-sectional view illustrating a reformer according to a first modified example of the second embodiment of the present invention.

FIG. 11 is a cross-sectional view illustrating the reformer of this embodiment with a modified heating section 237.

Referring to FIG. 11, in the reformer 230 according to the present modified example, the first portions of a resistance wire pattern 239a corresponding to the respective reaction sections 135 are formed in different thicknesses, thereby supplying different amounts of thermal energy to the different reaction sections 135. A smaller thickness for a given width of resistance wire results in a higher electrical resistance, and hence, a greater heat output.

Specifically, the thickness t1 of the resistance wire pattern 239a in the area corresponding to the first reaction section 141 is smaller than the thickness t2 in the area corresponding to the second reaction section 142. The thickness t2 of the resistance wire pattern 139a in the area corresponding to the second reaction section 142 is smaller than the thickness t3 in the area corresponding to the third reaction section 143.

Figure 12:
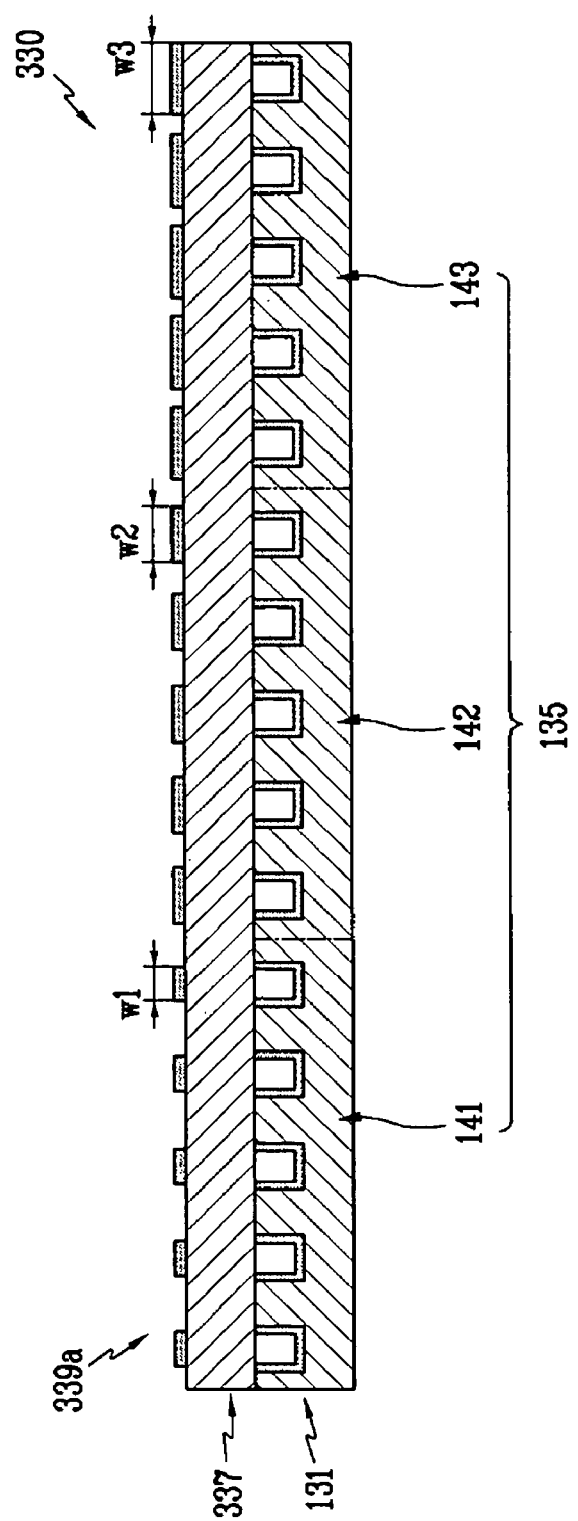
FIG. 12 is a cross-sectional view illustrating a reformer according to a second modified example of the second embodiment of the present invention.

FIG. 12 is a cross-sectional view illustrating the reformer of this embodiment with yet another modified heating section 337.

Referring to FIG. 12, in the reformer 330 according to the present modified example, the first portions of the resistance wire pattern 339a corresponding to the respective reaction sections 135 are formed in different widths, thereby supplying different amounts of thermal energy to the respective reaction sections 135. A smaller width for a given thickness of resistance wire results in a higher electrical resistance, and hence, a greater heat output.

Specifically, the width w1 of the resistance wire pattern 339*a* in the area corresponding to the first reaction section 141 is smaller than the width w2 in the area corresponding to the second reaction section 142. The width w2 of the resistance wire pattern 339*a* in the area corresponding to the second reaction section 142 is smaller than the width w3 in the area corresponding to the third reaction section 143.

Figure 13:
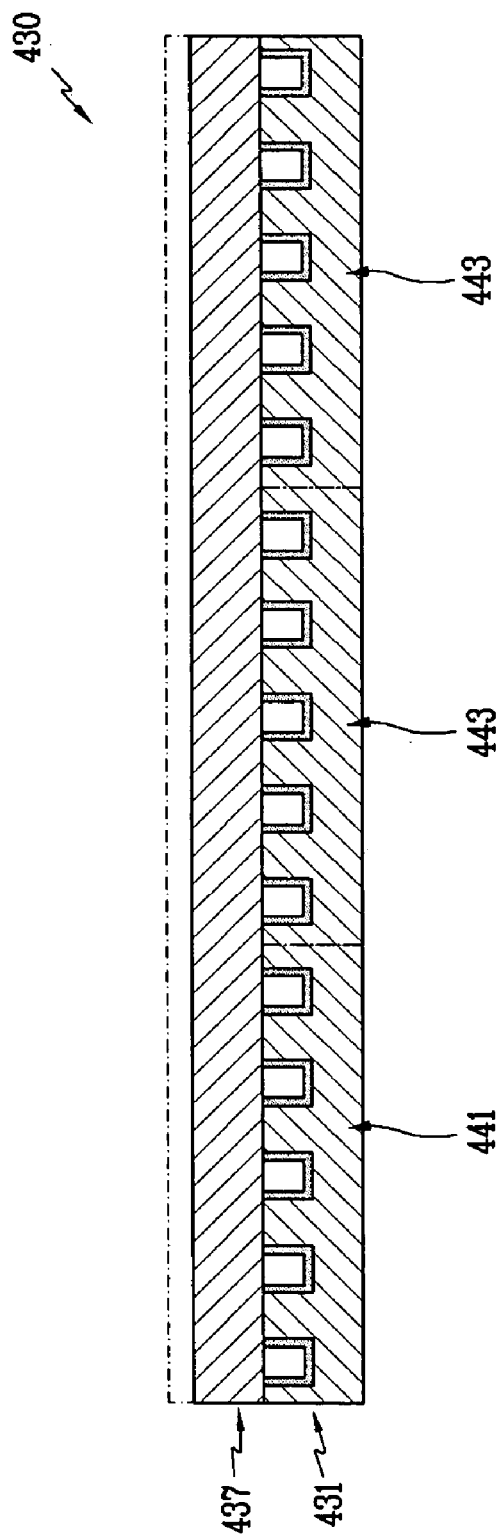
FIG. 13 is a cross-sectional view illustrating a reformer according to a third modified example of the second embodiment of the present invention.

FIG. 13 is a cross-sectional view illustrating the reformer with yet a third modified heating section 430.

Referring to FIG. 13, yet another embodiment is disclosed similar to that of FIGS. 9-12. The reformer 430 according to the present modified example includes a reaction plate 431 as described above with a first reaction section 441 and at least two third reaction sections 443. The at least two third reaction sections 443 both serve to reduce the concentration of carbon monoxide contained in the hydrogen gas generated from the first reaction section 441 through the preferential catalytic CO oxidation of the hydrogen gas and oxygen.

The heating section 437 according to the present modified example has a structure that different amounts of thermal energy are supplied to the respective reaction sections by making the resistance wire pattern different in gap, thickness, or width, similar to the second embodiment and the modified examples thereof. The structure of the resistance wire pattern has been described in the above-mentioned embodiments and thus description thereof is omitted.

Although two third reaction sections 443 are shown in FIG. 13, the present invention is not limited to it but may include more third reaction sections.

Figure 14:
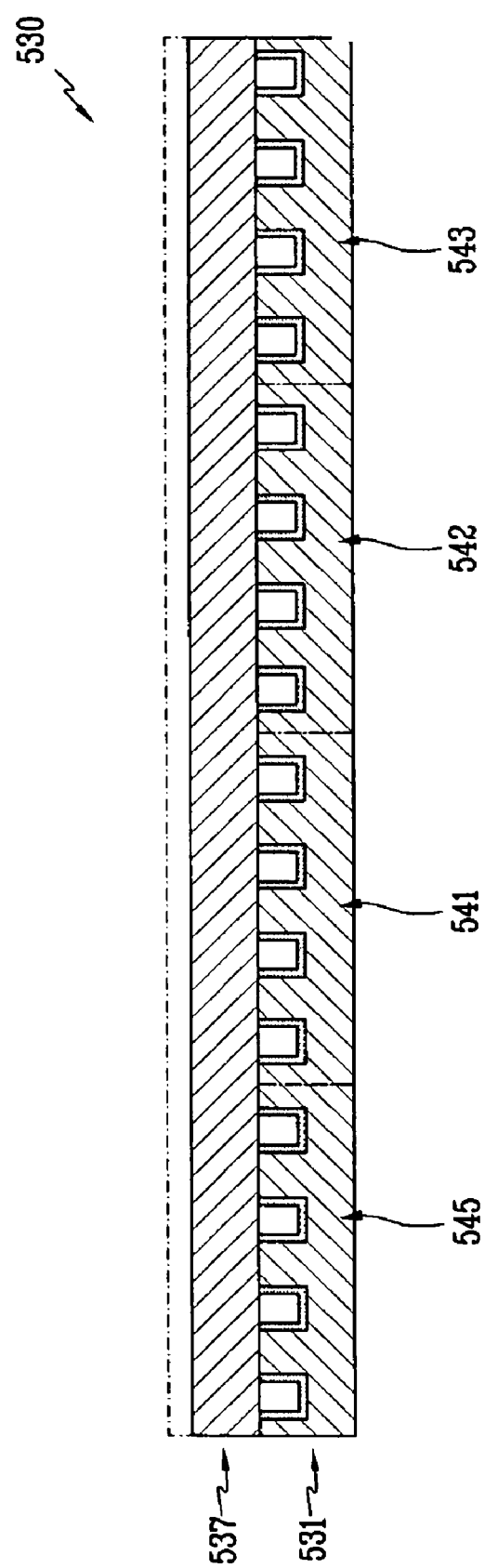
FIG. 14 is a cross-sectional view illustrating a reformer according to a fourth modified example of the second embodiment of the present invention.

FIG. 14 is a cross-sectional view illustrating a reformer according to still another modified example of a reformer with a reaction plate 531 as described above.

Referring to FIG. 14, the reformer 530 according to the present modified example includes a vaporization section 545, a first reaction section 541, a second reaction section 542, and a third reaction section 543. The vaporization section 545, the first reaction section 541, the second reaction 542, and the third reaction section 543 are sequentially disposed from the reformer inlet to the reformer outlet of the reaction plate 531.

The vaporization section 545 vaporizes the fuel injected through the reformer inlet and supplies the vaporized fuel to the first reaction section 541. The vaporization of fuel occurs at a temperature of about 700° C.

The vaporization section 545 is supplied with the thermal energy for keeping the temperature of about 700° C. from the resistance wire, vaporizes the fuel, and supplies the vaporized fuel to the first reaction section 541.

The heating section 537 according to the present modified example has a structure that different temperatures of thermal energy are supplied to the respective reaction sections by varying the gap, thickness, or width of the resistance wire pattern, similarly to the previously mentioned embodiments of the invention. The thermal energy of about 700° C. is supplied to the vaporization section 545. The structure of the resistance wire pattern has been described in the above-mentioned embodiments and thus description here is omitted.

Figure 15:
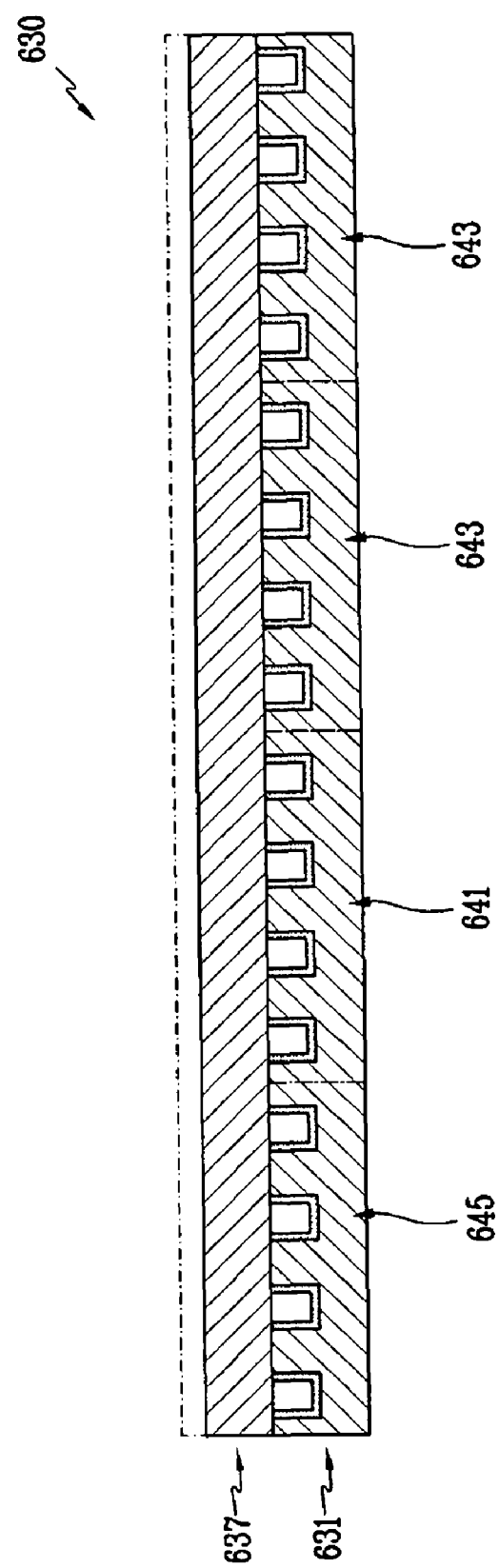
FIG. 15 is a cross-sectional view illustrating a reformer according to a fifth modified example of the second embodiment of the present invention.

FIG. 15 is a cross-sectional view illustrating a reformer according to still another embodiment of the present invention.

Referring to FIG. 15, the reformer 630 according to the present modified example includes plate reactor 631 with a vaporization section 645, a first reaction section 641, and at least two reaction sections 643. The vaporization section 645, the first reaction section 641, and the at least two third reaction sections 643 are sequentially disposed from the reformer inlet to the reformer outlet of the reaction plate 631.

Although the exemplary embodiments of the present invention have been described, the present invention is not limited to the embodiments, but may be modified in various forms without departing from the scope of the appended claims, the detailed description, and the accompanying drawings of the present invention. Therefore, it is natural that such modifications belong to the scope of the present invention.

What is claimed is:

1. A reformer of a fuel cell system comprising:
    a main body in which a plurality of reaction sections for generating hydrogen from hydrogen-containing fuel are integrally formed, the plurality of reaction sections comprising a reforming section and a preferential catalytic CO oxidation section; and
    a heating section which is disposed in contact with a first portion of the outer surface of the main body corresponding to the reforming section and a second portion of the outer surface of the main body corresponding to the preferential catalytic CO oxidation section, the heating section supplying a different amount of thermal energy to each of the plurality of reaction sections.

2. The reformer of claim 1, wherein the main body defines an inner space that is divided into a plurality of spaces which define the plurality of reaction sections, wherein the main body further defines a reformer inlet at one end and a reformer outlet at the other end.

3. The reformer of claim 2, wherein the heating section comprises a resistance wire of a coil shape wound around the outer circumferential surface of the main body in a predetermined number of windings, wherein the number of windings around the outer circumferential surface of the main body corresponding to a particular reaction section is different from the numbers of windings corresponding to the other of the reaction sections.

4. The reformer of claim 3, wherein the plurality of reaction sections includes the reforming section for generating hydrogen gas from the hydrogen-containing fuel and at least one carbon-monoxide reducing section for reducing the concentration of carbon monoxide contained in the hydrogen gas, and the number of windings of the resistance wire in an area corresponding to the reforming section is greater than the number of windings corresponding to the carbon-monoxide reducing section.

5. The reformer of claim 2, wherein the divided spaces within the inner space of the main body are divided by one or more barriers.

6. The reformer of claim 2, further comprising a heat insulating jacket surrounding the main body.

7. The reformer of claim 6, wherein the heat insulating jacket comprises an inner wall and an outer wall, the inner wall and outer wall spaced apart from one another to form an insulation space, wherein the insulation space is kept in a vacuum.

8. The reformer of claim 7, wherein the inner wall and the outer wall of the heat insulating jacket are made of a material selected from the group consisting of ceramics, stainless steel, aluminum, and combinations thereof.

9. The reformer of claim 1, wherein the main body is a plate-shaped main body with a surface defining a reformer inlet, a reformer outlet, and a channel joining the reformer inlet and the reformer outlet.

10. The reformer of claim 9, wherein the heating section comprises a heating plate coupled to the surface of the main body with a resistance wire pattern defining a number of passes formed on a surface of the heating plate.

11. The reformer of claim 10, wherein the plurality of reaction sections includes the reforming section for generating hydrogen gas from the hydrogen-containing fuel and at least one carbon-monoxide reducing section for reducing the concentration of carbon monoxide contained in the hydrogen gas, and the resistance wire pattern is configured such that a greater amount of heat is provided to the reforming section than to the carbon-monoxide reducing section.

12. The reformer of claim 11 wherein the resistance wire pattern is formed in a serpentine shape.

13. The reformer of claim 11, wherein the resistance wire pattern corresponding to a particular reaction section has a gap, width, or thickness different from the gap, width, or thickness of the other reaction sections.

14. The reformer of claim 13, wherein the gap of the resistance wire pattern in the area corresponding to the carbon-monoxide reducing section is larger than the gap in the area corresponding to the reforming reaction section.

15. The reformer of claim 13, wherein the thickness or width of the resistance wire pattern in the area corresponding to the carbon-monoxide reducing section is greater than the thickness or width of the resistance wire pattern in the area corresponding to the reforming reaction section.

16. The reformer of claim 1, wherein each of the reaction sections comprises a catalyst selected from the group consisting of pellet-shaped catalysts and honeycomb-shaped catalysts.

17. The reformer of claim 1, wherein the main body is made of a material selected from the group consisting of stainless steel, aluminum, copper, and iron.

18. A fuel cell system comprising:
at least one electricity generator; and
a reformer for generating hydrogen from a hydrogen-containing fuel, wherein the reformer comprises: a main body in which a plurality of reaction sections are integrally formed, the plurality of reaction sections comprising a reforming section and a preferential catalytic CO oxidation section; and a heating section disposed in contact with a first portion of the outer surface of the main body corresponding to the reforming section and a second portion of the outer surface of the main body corresponding to the preferential catalytic CO oxidation section, the heating section supplying a different amount of thermal energy to each of the plurality of reaction sections.

19. The fuel cell system of claim 18, wherein the main body defines an inner space divided into a plurality of spaces which define the plurality of reaction sections, a reformer inlet at one end of the main body and a reformer outlet at the other end of the main body.

20. The fuel cell system of claim 19, wherein the heating section includes a resistance wire of a coil shape wound a predetermined number of windings around the outer circumferential surface of the main body, wherein the number of windings around a particular reaction section is different from the number of windings around the other reaction sections.

21. The fuel cell system of claim 18, wherein the main body is a plate-shaped main body with a surface defining a reformer inlet, a reformer outlet, and a channel joining the reformer inlet and the reformer outlet.

22. The fuel cell system of claim 21, wherein the heating section comprises a heating plate coupled to the surface of the main body defining the channel, wherein the heating plate comprises a resistance wire pattern formed on its surface.

23. The fuel cell system of claim 18, wherein the plurality of reaction sections includes the reforming section, and at least one carbon-monoxide reducing section, and the heating section is configured such that a greater amount of heat is provided to the reforming section than to the carbon-monoxide reducing section.

24. The fuel cell system of claim 22, wherein the resistance wire pattern corresponding to a particular reaction section has a different gap, width, or thickness compared to the gap, width, or thickness of the resistance wire pattern corresponding to another of the reaction sections.

25. The fuel cell system of claim 22, wherein the resistance wire pattern defines a serpentine pattern.

26. The fuel cell system of claim 18, further comprising a fuel supply unit for supplying fuel to the reformer and an oxygen supply unit for supplying oxygen to the reformer and the electricity generator.

27. The fuel cell system of claim 26, wherein the oxygen supply unit comprises at least one air pump for supplying the air to the reformer and the electricity generator.

* * * * *